United States Patent
Kobayashi

[11] 3,724,331
[45] Apr. 3, 1973

[54] FEED MECHANISM FOR MACHINE TOOL

[75] Inventor: Akiyoshi Kobayashi, Kariya-shi, Aichi-ken, Japan

[73] Assignee: Toyoda Koki Kabushiki Kaisha, Kariya-shi, Aichi-ken, Japan

[22] Filed: Mar. 11, 1971

[21] Appl. No.: 123,212

[30] Foreign Application Priority Data

Mar. 13, 1970 Japan..................................45/24103

[52] U.S. Cl...................................91/407, 92/13.8
[51] Int. Cl............................F15b 15/22, F01b 9/02
[58] Field of Search........91/1, 6, 392, 404, 405, 407, 91/443; 92/13, 13.8

[56] References Cited

UNITED STATES PATENTS

| | | | |
|---|---|---|---|
| 3,162,092 | 12/1964 | Corwin | 91/407 |
| 3,260,212 | 7/1966 | Johnson | 92/13.8 |
| 1,971,048 | 8/1934 | Parsons | 91/407 |
| 2,151,057 | 3/1939 | Suth | 60/52 HE |
| 2,345,837 | 4/1944 | Smith | 91/443 |
| R24,419 | 1/1958 | Ziherl et al. | 92/13.8 |
| 2,587,182 | 2/1952 | Livers | 91/404 |
| 3,463,036 | 8/1969 | O'Connor | 91/392 |

FOREIGN PATENTS OR APPLICATIONS 1,244,797   9/1960   France..................................91/392

Primary Examiner—Martin P. Schwadron
Assistant Examiner—A. M. Zupcic
Attorney—Oblon, Fisher & Spivak

[57] ABSTRACT

A feed mechanism for a machine tool with a feed table is provided with a hydraulic cylinder for moving the feed table to perform a machining operation. In the cylinder a screw shaft is adjustably threaded into the rod of the piston thereof for adjusting the stroke length of the piston. The free end of the screw shaft is adapted to be brought into engagement with a resiliently urged stop member to control the exhausting of fluid from the cylinder so that the speed of the piston is reduced just before the piston is fully stopped.

9 Claims, 3 Drawing Figures

INVENTOR
AKIYOSHI KOBAYASHI

FEED MECHANISM FOR MACHINE TOOL

BACKGROUND OF THE INVENTION

This invention relates to a feed mechanism for machine tools.

In a conventional feed mechanism for a dead stop machining wherein a machining operation is completed by engagement of an abutment, associated with the feed movement of a feed table by a hydraulic cylinder, with a fixed stop member, the stroke of the piston of the cylinder is limited by engagement of the abutment arranged on a feed hand wheel with the associated stop member. The feed amount of the feed table is therefore limited within one rotation of the hand wheel. Moreover, it is possible that the engagement of the abutment with the stop member during rotation of the hand wheel may cause torsion of a shaft in the drive connection.

In addition, the feed cylinders of such devices presently offer no means for reducing the speed of the piston just before the piston reaches its stroke end, whereby slippage may be caused between clutch portions in the drive connection by engagement of the piston with the cylinder end, and the present devices therefore offer lower machining accuracy than is desirable.

SUMMARY OF THE INVENTION

Accordingly, it is a primary object of the present invention to provide an improved feed mechanism for a machine tool having novel means for adjusting the feed amount of the piston in a wide range and means for reducing the speed of the piston of the hydraulic cylinder just before the piston reaches the end of its stroke, the latter means requiring no adjustment thereof regardless of adjustments made in the feed amount.

The foregoing and other objects are attained by the present invention which provides a hydraulic cylinder for use in a machine tool for moving the feed table thereof to perform a machining operation. A screw shaft is adjustably threaded into the rod of the hydraulic cylinder piston for adjusting the stroke length of the piston. The free end of the screw shaft carries an abutment which is adapted to engage a resiliently biased stop member that serves as a valve in a fluid control circuit for controlling the exhausting of fluid from the side of the cylinder in which direction the piston is moving so that the speed of the moving piston is effectively reduced just before the piston reaches the end of its stroke, or bottoms out, thereby relieving the impact of the piston with the end wall of the hydraulic cylinder.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference numerals designate like or corresponding parts throughout the several views, and wherein.

DETAILED DESCRIPTION OF THE INVENTION

Figure 1:
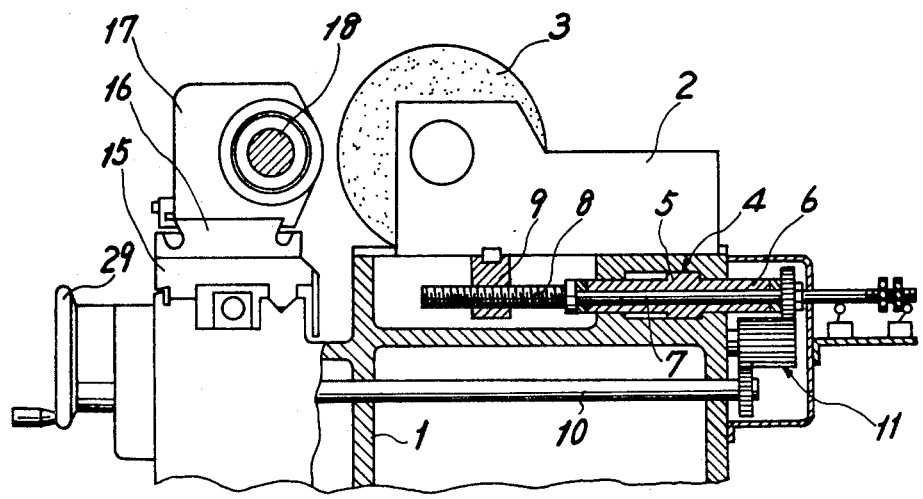
FIG. 1 is a front view, partly in section of a grinding machine according to the present invention.

Referring now to the drawings and particularly to FIG. 1, there is shown a bed 1 on which is slidably mounted a wheel support 2 for rotatably supporting a grinding wheel 3. Mounted in the bed 1 is a rapid feed hydraulic cylinder 4 having a piston 5 slidably received therein and a piston rod 6 integrally formed with the piston 5. Rotatably mounted in the piston 5 is a coaxially disposed feed shaft 7 having disposed on one end thereof a feed screw 8 which threadably engages a feed nut 9 depending from the lower surface of the wheel support 2. The feed shaft 7 is drivingly connected at its intermediate portion to a shaft 10 rotatably supported in the bed 1 through a gear connection generally indicated by the reference numeral 11. A work table 15 is slidably mounted on one end of the bed 1 for movement perpendicular to that of the wheel support 2 and pivotally supports a swivel table 16 thereon. A head stock 17 and a foot stock, not shown, are mounted on the swivel table 16 to support a workpiece 18.

Figure 2:
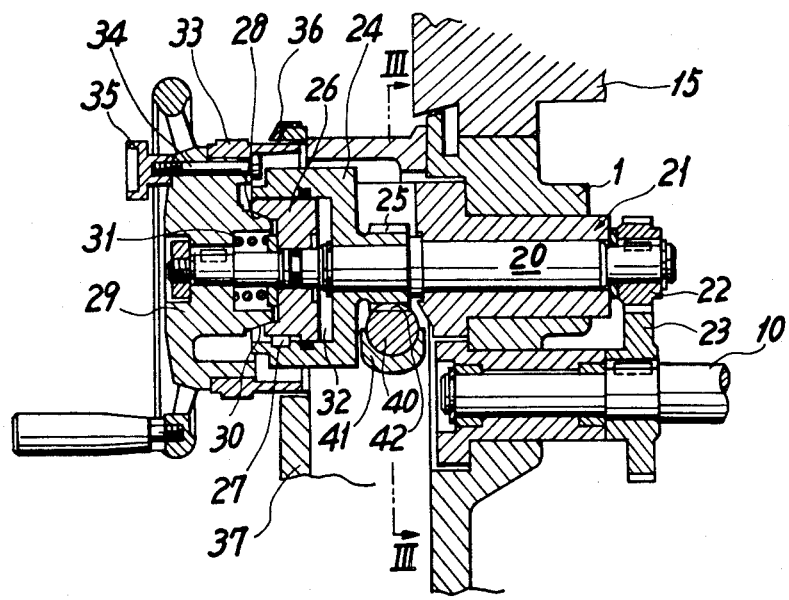
FIG. 2 is a fragmentary sectional view of a feed mechanism shown in FIG. 1.

Referring to FIG. 2, there is shown a drive shaft 20 rotatably received in a bearing 21 secured to the work table end of the bed 1. The drive shaft 20 has keyed thereto a gear 22 which engages a gear 23 secured on the shaft 10. A cup-shaped member 24 is rotatably mounted on the drive shaft 20 and has a gear 25 secured to the wall thereof. A piston 26 is slidably received in the open end of the cup-shaped member 24, which thereby forms a hydraulic cylinder therefor, but is restrained from rotation with respect thereto by means of a key member 27. The piston 26 is provided with a tapered bore 28 in one end thereof.

Keyed to the end of the drive shaft 20 is a hand wheel 29 having on the inner portion thereof a tapered surface 30 cooperatively associated with the tapered bore 28 of the piston 26. A spring 31 is disposed within a bore formed on the inner tapered end of the hand wheel 29 for normally urging the piston 26 and the hand wheel 29 to move axially away from each other. Accordingly, when a pressure fluid is admitted into a chamber 32 formed between the cup shaped member 24 and the piston 26, the piston 26 and the hand wheel 29 are frictionally engaged between the tapered bore 28 and the tapered surface 30 for being rotated as a unit so as to perform an automatic feed operation, as described hereinafter. On the other hand, when the pressure fluid is exhausted from the chamber 32, the frictional engagement between the tapered bore 28 of the cup-shaped member 24 and the tapered surface 30 of the hand wheel 29 is released under the separating force of the spring 31 so that a manual feed operation may be performed by the hand wheel 29.

An annular ring scale 33 is rotatably mounted on the outer periphery of the hand wheel 29 and is adapted to be clamped in any angular position by means of a bolt 34 and a nut 35. An indicator 36 is secured on a casing 37, which is attached to the same end of the bed 1 as is the hand wheel 29, for indicating an appropriate graduation marked on the scale ring 33.

Figure 3:
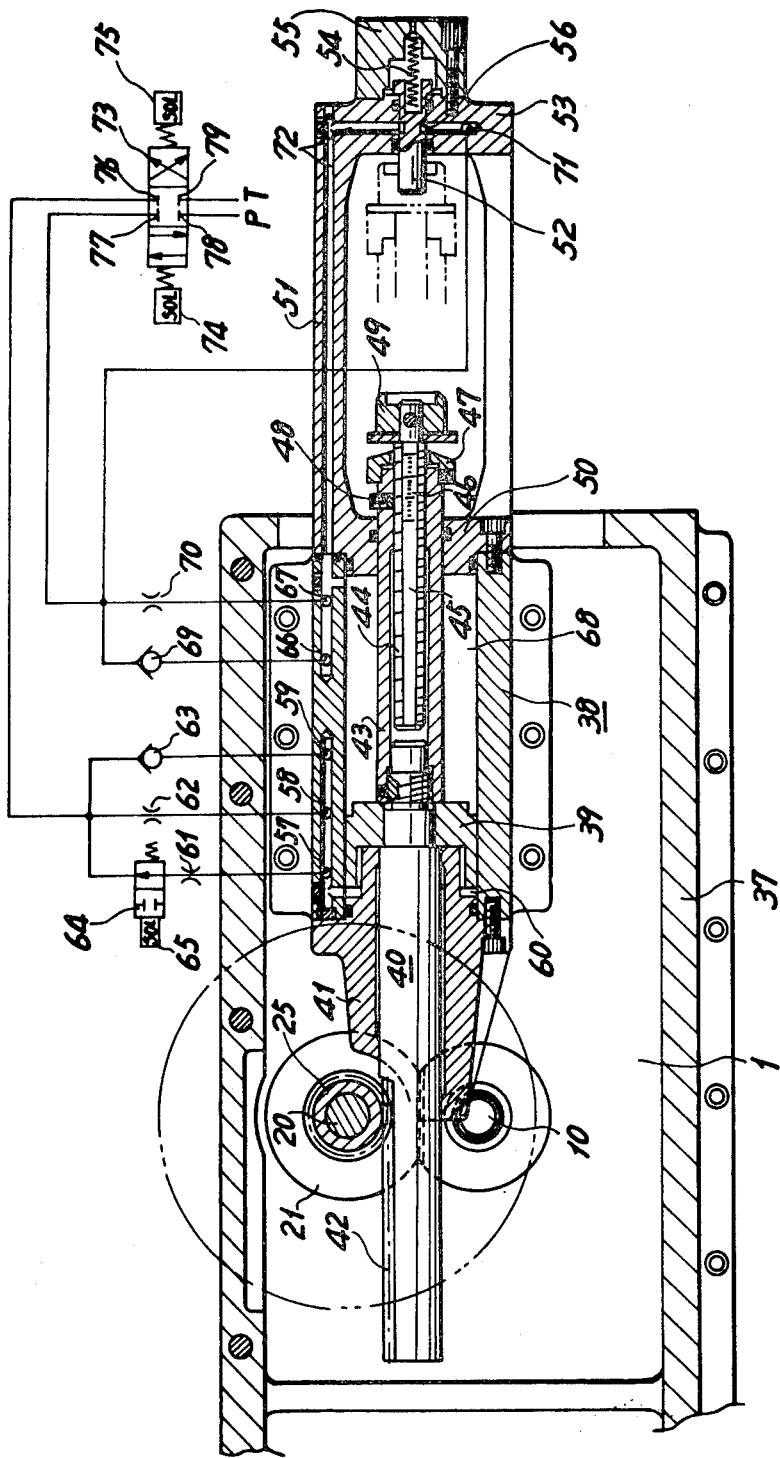
FIG. 3 is a sectional view taken along the line III—III of FIG. 2.

An apparatus for providing an automatic feed operation, which embodies the features of the present invention, will now be described with particular reference being made to FIG. 3. A hydraulic cylinder 38 is secured to the bed 1 and is covered by the casing 37. A piston 39 is slidably received in the cylinder 38. A shaft 40 is slidably received in another casing 41 secured to the one end of the cylinder 38 in sealed relation therewith. The shaft 40 is connected at one end thereof to the left side of the piston 39, as viewed in FIG. 3, and has at the other end thereof a rack portion 42 formed thereon which engages the gear 25 of the cup-shaped member 24. Connected to the right side of the piston 39 is one end of a hollow piston rod 43 having an internally threaded portion at its other end. A screw shaft 44 is axially adjustably screwed in the threaded portion of the piston rod 43. The screw shaft 44 has on the periphery thereof an elongate axial flat surface 45 on which graduations 46 are marked. An indicator 47 is secured outside the cylinder 38 to the right side of the piston rod 43 to indicate an appropriate graduation 46 on the screw shaft 44. Also positioned outside the cylinder 38 is a set screw 48 screwed radially into the piston rod 43 for clamping the screw shaft 44 in a desired axially adjusted position therein. The screw shaft 44 has an abutting member 49 fixed to the right end thereof outside the cylinder 38 and the piston rod 43.

A wall 50 of a supporting member 51 is connected to the right end of the cylinder 38 and slidably receives the hollow piston rod 43 in sealed relation therewith. A stop member 52 is slidably received in an oppositely disposed wall 53 of the supporting member 51 in line with the abutting member 49. Interposed between an end plate 55 secured to the wall 53 and the stop member 52 is a spring 54 which normally urges the stop member 52 toward the left, as viewed in FIG. 3, or in the direction of the abutting member 49. Movement of the stop member 52 in this direction is prevented, however, by an annular flange on one end thereof which engages the end surface of the wall 53. The stop member 52 is provided with an annular groove 56 in its peripheral surface substantially intermediate its length, the purpose of which will follow.

Ports 57, 58 and 59, all of which fluidly communicate with an end chamber 60 of the cylinder 38 on the left side of piston 39, are respectively connected to a throttle 61, a second throttle 62 more restrictive than the first throttle 61, and a check valve 63 in parallel relation with one another. The throttle 61 may be closed by a change over valve 64 which is actuated by a solenoid SOL 65. Providing fluid communication with a chamber 68 on the other end of the cylinder 38, or on the right side of the piston 39, are ports 66 and 67 which are respectively connected to a check valve 69 and a throttle 70 in parallel relation with one another. A port 71 is provided in the wall 53 of the supporting member 51 housing the stop member 52 for fluidly communicating with the right chamber 68 of the cylinder 38 through the annular groove 56 of the stop member 52 in its left end position and a passage 72 provided in the supporting member 51. A change over valve 73 which is selectively actuated by solenoids SOL 74 and SOL 75 has one port 76 thereof connected to the throttles 61 and 62 and the check valve 63, while another port 77 thereof is connected to the port 71 in the side wall 53 of the supporting member 51, the check valve 69 and the throttle 70. A third port 78 of the valve 73 is connected to a pressure fluid supply source P and a fourth port 79 is connected to a tank T.

The automatic feed operation according to the present invention will now be described. For providing such automatic feed, fluid under pressure is supplied into the chamber 32 to cause frictional engagement between the piston 26 and the hand wheel 29. When a grinding operation is completed by movement of the grinding wheel 3 toward the workpiece 18 and accordingly the piston 39 of the cylinder 38 is in the position shown in FIG. 3, the solenoid SOL 74 is deenergized while the solenoid SOL 75 is energized. A pressure fluid from the source P is accordingly supplied into the left chamber 60 of the cylinder 38 through the port 76 of the valve 73, the check valve 63 and the port 59, while the fluid in the right chamber 68 of the cylinder 38 is exhausted or returned to the tank T through the passage 72, the annular groove 56 of the stop member 52 in its left end position, the port 71 and the port 77 of the valve 73, whereby the piston 39 and the shaft 40 is moved to the right, as viewed in FIG. 3, at a relatively rapid speed. This rightward movement of the shaft 40 causes the gear 25 meshing the rack 42 on the shaft 40 to be rotated in a counterclockwise direction. Rotation of the gear 25 is transmitted to the feed shaft 7 through the cup-shaped member 24, the key member 27, the piston 26, the hand wheel 29, the shaft 20, gears 22 and 23, the shaft 10 and the gear connection 11. Rotation of the feed shaft causes relatively rapid movement of the wheel support 2 to the right, as viewed in FIG. 1, through the threaded engagement between the feed screw 8 on the end of shaft 7 and the feed nut 9.

Simultaneously, fluid under pressure is being supplied to the cylinder 4 to move the wheel support 2 to the right at an even more rapid speed. During the rightward movement of the piston 39, the abutting member 49 of the screw shaft 44 is brought into engagement with one end of the stop member 52, as shown in dotted line form in FIG. 3, to urge it to the right against the force of the spring 54 to close the fluid connection between the port 71 and the passage 72. At this point, the fluid being exhausted from the right chamber 68 of the cylinder 38 continues to return to the tank T, but now passes through the throttle 70, whereby the speed of movement of the piston 39 to the right is substantially reduced. The rightward movement of the piston 39 at the reduced speed is then stopped when the flanged end of the stop member 52 engages the inner shoulder portion of the end plate 55. Thus, the change in speed of the piston 39 is effective to relieve impact of the piston 39 with respect to the left wall 50 of the supporting member 51. The wheel support 2 is accordingly moved to its right end position, as shown in FIG. 1, which may be confirmed by any suitable means, such as a limit switch.

When a "start" push button in an electric control system, not shown, is controlled, the cylinder 4 is supplied with pressure fluid to move the wheel support 2 from its right end position toward the workpiece 18 at a relatively rapid speed. Upon such leftward movement of the piston 5 of the cylinder 4 to its stroke end, the solenoid SOL 74 is energized to supply pressure fluid into the right chamber 68 of the cylinder 38 through the port 77 of the valve 73, the check valve 69 and the port 66. On the other hand, the fluid in the left chamber 60 now may be returned to the tank T mainly through the throttle 61. The piston 39 and the shaft 40 is therefore moved to the left at a relatively reduced speed. This return movement of the shaft 40 causes rotation of the gear 25 in the opposite or clockwise direction, as viewed in FIG. 3. Similar to the previously mentioned manner, rotation of the gear 25 is transmitted to the feed shaft 7 to move the wheel support 2 to the left, to thereby perform a rough grinding operation. When the rough grinding operation is completed, which is confirmed by a suitable means such as a limit switch, the solenoid SOL 65 of the valve 64 is energized to close the throttle 61. The fluid being exhausted from the left chamber 60 of the cylinder 38 now is returned to the tank T through the more restrictive throttle 62, which further reduces the speed of the piston 39, and thereby is operative to permit a fine grinding operation to be carried out. Upon movement of the piston 39 to its left stroke end, the fine grinding operation is completed.

While the invention has been described by means of a specific embodiment, it should be understood that the novel characteristics thereof may be incorporated in other structural forms without departing from the spirit and scope of the invention as defined in the following claims.

What is claimed as new and desired to be secured by Letters Patent of the United States is:

1. In a feed mechanism for a machine tool with a feed table having a hydraulic cylinder, a piston slidably disposed in the cylinder and separating the same into two chambers, a shaft connected to one side of the piston and having a rack portion formed thereon, a drive connection including a pinion engaging the rack portion for moving the feed table, a piston rod connected to the other side of the piston, and means for selectively supplying and exhausting a pressure fluid from the respective chambers of the cylinder, the improvement comprising:
   screw shaft means axially adjustably threaded into the piston rod for permitting adjustment of the stroke of said piston;
   resiliently biased stop means positioned outside of said cylinder for engagement with the screw shaft means upon displacement of said piston in one direction and serving to mechanically limited the movement of said piston at one end position thereof; and
   valve means disposed on said stop means for controlling the exhausting of fluid from the cylinder chamber on said screw shaft side of said piston, for reducing the speed of the piston just before the piston reaches the end of its stroke, regardless of adjustment of the stroke of said piston.

2. A feed mechanism as set forth in claim 1, further comprising:
   graduations on the peripheral surface of said screw shaft means; and
   an indicator on said piston rod cooperative with said graduations on the screw shaft means for indicating the relative adjusted position therebetween.

3. A feed mechanism as set forth in claim 1, wherein said valve means is connected between a fluid source in said supplying and exhausting means and one of the chambers of said cylinder together with parallel lines having a check valve and a throttle respectively disposed therein.

4. A feed mechanism as set forth in claim 1, wherein said piston rod is in the form of a hollow cylindrical member projecting beyond said cylinder from one end thereof in sealed relation therewith; and
   said screw shaft means is threaded into said projecting end of said piston rod.

5. A feed mechanism for a machine tool having a feed table comprising:
   a hydraulic cylinder;
   a piston slidably disposed in said hydraulic cylinder and having a piston rod thereon;
   means connecting said piston and said feed table for moving said feed table in response to movement of said piston in said cylinder;
   a fluid pressure supply;
   fluid control circuit means between said supply and the opposite sides of said hydraulic cylinder for selectively supplying fluid pressure to one side of said cylinder while simultaneously exhausting fluid from the other side for moving said piston in one direction and supplying fluid pressure to the other side of said cylinder while exhausting fluid from said one side for moving said piston in the opposite direction;
   a shaft axially adjustably disposed in said piston rod and having a portion thereof projecting beyond said piston rod; and
   stop means for said piston rod operable by said shaft portion for controlling the fluid control circuit means to reduce the speed of said piston, regardless of adjustment of the stroke of said piston, just before the piston reaches the end of its stroke in said cylinder and for mechanically limiting the movement of said piston at one end position thereof.

6. The feed mechanism set forth in claim 5, wherein said stop means comprises a movable stop member positioned in said fluid control circuit means;
   means normally urging said stop member in a given direction to permit fluid communication between said supply and one side of said hydraulic cylinder through said stop member; and
   said stop member being movable in the opposite direction by said piston rod for shutting off fluid communication between said supply and said cylinder through said stop member.

7. The feed mechanism set forth in claim 6, wherein said piston rod is a hollow member and said shaft is threadably engaged therein.

8. The feed mechanism set forth in claim 6, wherein said fluid control circuit means comprises another fluid communication path between said supply and said one side of said hydraulic cylinder parallel with said fluid communication path through said stop member, said another parallel path having a fluid flow restrictor therein.

9. The feed mechanism set forth in claim 8, wherein said fluid control circuit means comprises a third fluid communication path between said supply and said one side of said hydraulic cylinder, said third path having a check valve therein.

* * * * *